United States Patent [19]

Namekawa

[11] Patent Number: 4,768,515

[45] Date of Patent: Sep. 6, 1988

[54] ULTRASONIC BLOOD FLOW IMAGING APPARATUS

[75] Inventor: Kouroku Namekawa, Tokyo, Japan

[73] Assignee: Aloka Co., Ltd., Tokyo, Japan

[21] Appl. No.: 947,033

[22] Filed: Dec. 22, 1986

[30] Foreign Application Priority Data

Dec. 26, 1985 [JP] Japan .................................. 60-292113

[51] Int. Cl.$^4$ ............................................ A61B 10/00
[52] U.S. Cl. ................................ 128/661.09; 358/82
[58] Field of Search .................. 128/660, 663; 358/81, 358/82; 340/703; 342/181; 73/861.25

[56] References Cited

U.S. PATENT DOCUMENTS

| 4,612,937 | 9/1986 | Miller | 128/663 |
| 4,641,668 | 2/1987 | Namekawa | 128/663 |
| 4,671,294 | 6/1987 | Magnin et al. | 128/663 |

OTHER PUBLICATIONS

Pizer, S. M. et al., "Color Display in Ultrasonography," Ultrasound in Medicine and Biology, vol. 9, No. 4, pp. 331–345, Pergamon Press Ltd.

Primary Examiner—Francis J. Jaworski
Attorney, Agent, or Firm—Koda and Androlia

[57] ABSTRACT

The present invention provides an ultrasonic blood flow imaging forming apparatus in which ultrasonic beams are transmitted into and reflected by a living body to color-display the distribution of velocity in a moving member and the properties of the living body's tissue on a CRT screen in the two-dimensional manner.

The ultrasonic blood flow imaging apparatus includes a color processing section for forming an image in accordance with vector signals, the color processing section including a color processor responsive to vector angles in the vector signals to change the hue, and a brightness processor responsive to amplitude of the vector signals to change the brightness of the hue. The apparatus also includes a complementary color mixing processor responsive to the third data of the living body obtained from the ultrasonic received signals to mix the hue which is outputted from the color processor with its complementary color.

For example, when the motion of the moving reflective member is displayed, the directions of the moving reflective member are indicated with different hues corresponding to vector angles in the vector signals while the velocities of the moving reflective member are represented with different brightnesses corresponding to amplitude of the vector signals. Furthermore, the third data including velocity deviations and others are displayed with a color saturation obtained by mixing the hue determined by the corresponding vector angle with its complementary color.

Therefore, various states of the moving reflective member, that is, the velocity, brightness and direction can easily be observed with changes of the hue. Furthermore, the variance of the velocity represented by the velocity deviations can be observed with changes of the color saturation.

7 Claims, 4 Drawing Sheets

ULTRASONIC BLOOD FLOW IMAGING APPARATUS

BACKGROUND OF THE INVENTION

1. Field of the Invention

The present invention relates to an ultrasonic blood flow imaging apparatus and more particularly to the improvement of such an apparatus which is capable of two-dimensionally in color displaying the velocity distribution of a moving member such as blood flow or the property of tissues within a living organism.

2. Description of the Prior Art

There are well known ultrasonic imaging apparatuses wherein an ultrasonic wave beam is directed into a subject to be examined and an image is formed using the reflected echo signals produced as a result of differences in acoustic impedance within the subject under examination. These ultrasonic imaging apparatuses have been practically applied to ultrasonic diagnostic apparatuses, ultrasonic Doppler diagnostic apparatuses and the like. These apparatuses are advantageous in that they make it possible to observe the interior of the subject without adversely affecting its structural make-up and are therefore used, for example, in visual diagnostic examination of afflicted tissues and organs in the human.

In such ultrasonic Doppler diagnostic apparatuses, the Doppler effect that arises when an ultrasonic pulse beam strikes the moving member such as blood flow in a body to be examined is used to determine the velocity of movement of blood flow. In the ultrasonic Doppler diagnostic apparatus, the velocity of the moving member is displayed as colored images. For example, see our U.S. Pat. No. 4,573,477.

Such an apparatus provides different colors and their hues corresponding to the forward and rearward directions or velocities of blood flow, respectively. For example, the flow of blood approaching a probe of the apparatus is displayed in red color while the flow of blood moving away from the probe is displayed in blue color. In addition to the color display, the velocity of blood flow is indicated with changes of brightness. Thus, two-dimensional distribution of velocity can be easily realized to provide color display of the moving member in the living body.

However, in the prior art ultrasonic diagnostic apparatuses the moving reflective member can be displayed in color only in the limited directions, that is, in the first direction in which the moving reflective member approaches the detecting probe and in the second direction in which the moving reflective member moves away from the detecting probe. This results from the fact that the orientation of the moving reflective member cannot accurately and promptly be determined in all the directions.

In recent years, proposals have been made which calculate the vector velocities of the moving reflective member to determine the velocities thereof in all the directions. For example, there has been proposed a method of irradiating a body to be examined with ultrasonic beams from two different directions and then determining vector velocities from the velocity components in the directions of the beams. Furthermore, a method of measuring the vector velocities by use of a single ultrasonic beam has been filed by the inventors simultaneously.

It is thus desired to provide an apparatus which makes it possible to clearly display in color the state of a moving reflective member in all the directions.

The prior art apparatuses have a further problem in that they cannot accurately display the properties of tissue, for example, such as the hardness, density and so on, because the apparatuses display mainly the configuration of the tissue about its boundaries.

SUMMARY OF THE INVENTION

It is therefore an object of the present invention to provide an ultrasonic blood flow imaging apparatus which can color-display the vector velocities of a moving reflective member or the vectors indicative of the properties of a tissue such as its hardness and so on.

To this end, the present invention provides an ultrasonic blood flow imaging apparatus utilizing color processing means for forming color image signals to display data of a living body including a moving member in two-dimensional manner in accordance with vector signals obtained from ultrasonic echo signals, said color processing means comprising a color processor responsive to the vector angle of each of the vector signals to change the color and its hue and brightness processor responsive to the amplitude of each of the vector signals to adjust the brightness of the color and its hue.

The ultrasonic blood flow imaging apparatus of the present invention intends to afford color-display of vectors obtained from vector signals, that is to say, vector angles or amplitudes of the vector signals. For example, where a vector velocity in a moving reflective member is displayed, the vector angle indicates the direction of movement. Different directions of movement will be displayed with different colors and their hues, respectively. On the other hand, the brightness of a color is regulated in association with the amplitude of the vector signal indicative of the magnitude of the velocity.

Even where the properties of tissue including hardness are displayed, they can be represented with vectors each having an amplitude and phase.

The present invention further provides an ultrasonic blood flow imaging apparatus utilizing color processing means for forming color image signals to display data of a living body including a moving member in two-dimensional manner in accordance with vector signals obtained from ultrasonic received echo signals, said color processing means comprising a color processor responsive to the vector angle of each of the vector signals to change the hue and the brightness processor responsive to the amplitude of each of the vector signals to change the brightness of hue, and complementary color mixing processor responsive to the third data from the ultrasonic received signals to mix the output hue from said color processor with its complementary color.

The above-mentioned apparatus is adapted to change the hue in response to changes in the vector angle, to vary the brightness in response to changes in the amplitude and additionally to display the third data obtained from the ultrasonic received signals, for example, velocity deviation by the use of a saturation. The velocity deviations represent a variance of the moving reflective member. By adding a complementary color in response to the magnitude of the variance, the color saturation will indicate the variance or velocity deviation of the moving reflective member. This serves to know a certain state, for example, turbulence in the blood flow.

In the diagnosis of tissue, the third data may include the moisture content in the tissue, data of whether or not the tissue is fibrous and so on. Such data can be displayed by the spectrum analysis for signals.

DETAILED DESCRIPTION OF PREFERRED EMBODIMENTS

The present invention will now be described by way of example with reference to the drawings.

Figure 1:
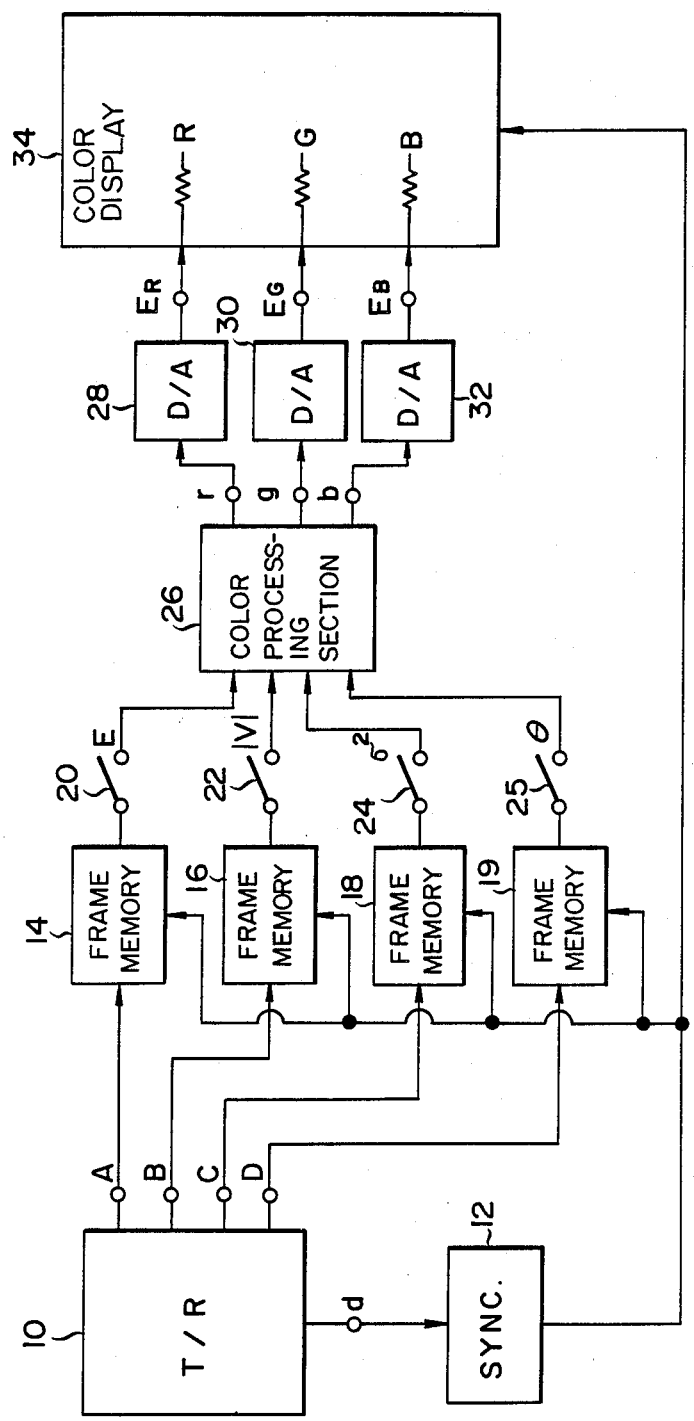
FIG. 1 is a block diagram of a preferred embodiment of an ultrasonic diagnostic apparatus to which an ultrasonic blood flow imaging apparatus according to the present invention is applied.

Referring first to FIG. 1, there is shown an ultrasonic diagnostic apparatus according to the present invention which may be used to form the tomographic image of a given section in a human body. The ultrasonic diagnostic apparatus is adapted to display a B-mode tomographic black-and-white image in addition to the distribution of velocity in a moving reflective member such as blood flow, which can be obtained by the Pulse Doppler method.

The ultrasonic diagnostic apparatus comprises an ultrasonic transmission and reception device 10 which is adapted to form B-mode tomographic image signals by the use of ultrasonic pulse beams and also to obtain velocity distribution signals, for example, with respect to the flow of blood in the plane including the B-mode tomographic image on transmission and reception of the ultrasonic pulse beams.

More particularly, the ultrasonic transmission and reception device 10 comprises a combination of the conventional B-mode echoing device with an ultrasonic Doppler device. Said tomographic image may be formed by either of linear or sector electronic scan.

Figure 2:
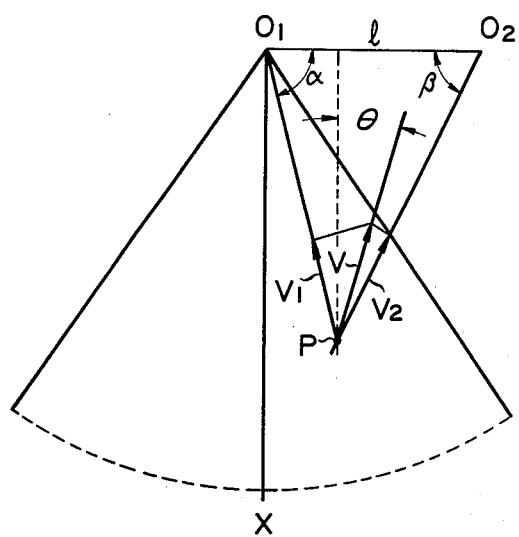
FIG. 2 illustrates a process of determining a vector velocity in the embodiment of FIG. 1.

As seen from FIG. 2, the ultrasonic transmission and reception device 10 may be in the form of a dual beam Doppler device including two probes $O_1$ and $O_2$ which are spaced apart from each other by a distance 1. Ultrasonic pulse waves are radiated to a point spaced equally from the two probes (denoted by P in FIG. 2) with the respective deviation angles $\alpha$ and $\beta$. The device 10 then receives pulse waves reflected by the flow of blood at the point P to determine radial velocities $V_1$ and $V_2$. These radial velocities are used to calculate vector velocities. The device 10 finally determines and generates outputs indicative of the absolute value of each of the vector velocities which represents the magnitude of that velocity and indicative of a vector angle relative to the center line $O_1 X$ of the scan angle.

Thus, the ultrasonic transmission and reception device 10 will generate four different signals: The first one of these signals is a tomographic image signal obtained at the terminal A and includes a B-mode tomographic image signal showing a desired tomographic plane. The second signal is a velocity signal obtained by the Pulse Doppler method and in the form of a signal which is raised at the terminal B and indicative of the absolute value of the average velocity in the flow of blood in the illustrated embodiment. The third signal is in the form of a signal which is raised at the terminal C and indicative of the angle of that vector, for example, the direction of movement. Finally, the fourth signal is a deviation signal as the third data of a living body obtained at the terminal D. The fourth signal is one of velocity signals obtained by the Pulse Doppler method and which includes data of a velocity deviation value relative to the average value of momentary velocities in the blood flow. For example, such a deviation signal is a standard deviation value or a variance value corresponding to the square of the standard deviation value.

Said four different signals are outputted from the ultrasonic transmission and reception device 10 after reflected echoes as analog signals therein have been converted and processed into digital signals. The transmission and reception device 10 further generates transmission repeated pulses, clock pulses or address signals along the direction of transmitted and received waves at the output terminal d thereof. Such signals are then applied to a synchronization controller 12 for generating synchronizing signals required to effect memory operation or display which will be described.

The four different signals from the transmission and reception device 10 are written in frame memories 14, 16, 18 and 19, respectively. The write addresses are determined by synchronizing signals from the synchronization controller 12. Thus, the frame memories 14, 16, 18 and 19 will store the tomographic image signal, the signal indicative of the absolute value of the average flow velocity, the vector angle signal and the deviation signal used as the third data in the living body, respectively.

The contents of the frame memories 14, 16, 18 and 19 are supplied to a color processing section 26 through selection switches 20, 22, 24 and 25, respectively. The selection switches 20, 22, 24 and 25 can selectively be switched on or off to display only detected data or a combination of any data.

On the other hand, the data supplied to the color processing section 26 are converted into color image signals in accordance with a signal processing operation. In the illustrated embodiment, three different color image signals corresponding to the three primary colors including red (R), green (G) and blue (B) colors are operated by and outputted from the color processing section 26. The three different color image signals are then supplied to the input terminals of a color display 34 through the respective D/A converters 28, 30 and 32 each of which is adapted to convert digital signals into analog signals. In the illustrated embodiment, the color display 34 comprises a color Braun tube including three inputs R, G and B which receives the outputs of the respective D/A converters 28, 30 and 32.

Since the sweep input of the color display 34 has received the synchronizing signals from the synchronization controller 12, the color display 34 can display a two-dimensional color image showing the distribution of the data corresponding to the respective addresses in the respective frame memories 14, 16, 18 and 19.

In the illustrated embodiment, the color display 34 provides a white-color image when equal voltages $E_R$, $E_G$ and $E_B$ are applied to the respective inputs R, G and B thereof. At this time, the brightness of the white-color image is variable in response to changes in the input voltages. Thus, a tomographic image in the living body can be displayed as a black-and-white image.

If only the selection switch 20 is switched on or if only the tomographic image signals are outputted from the transmission and reception device 10, the color display device 34 will thus display a B-mode tomographic image in the white color.

The present invention is characterized in that vectors including vector velocities and other vectors can be color-displayed in the two-dimensional manner. To this end, the color processing section 26 comprises a color processor for setting a hue in response to a vector angle and a brightness processor for regulating the brightness in response to the amplitude of the vector signal, that is, the absolute value of the velocity.

The present invention also is characterized in that the color processing section 26 comprises a complementary color mixing processor for mixing the hue set according to the vector angle in response to the third living body data with a complementary color thereof.

Figure 3:
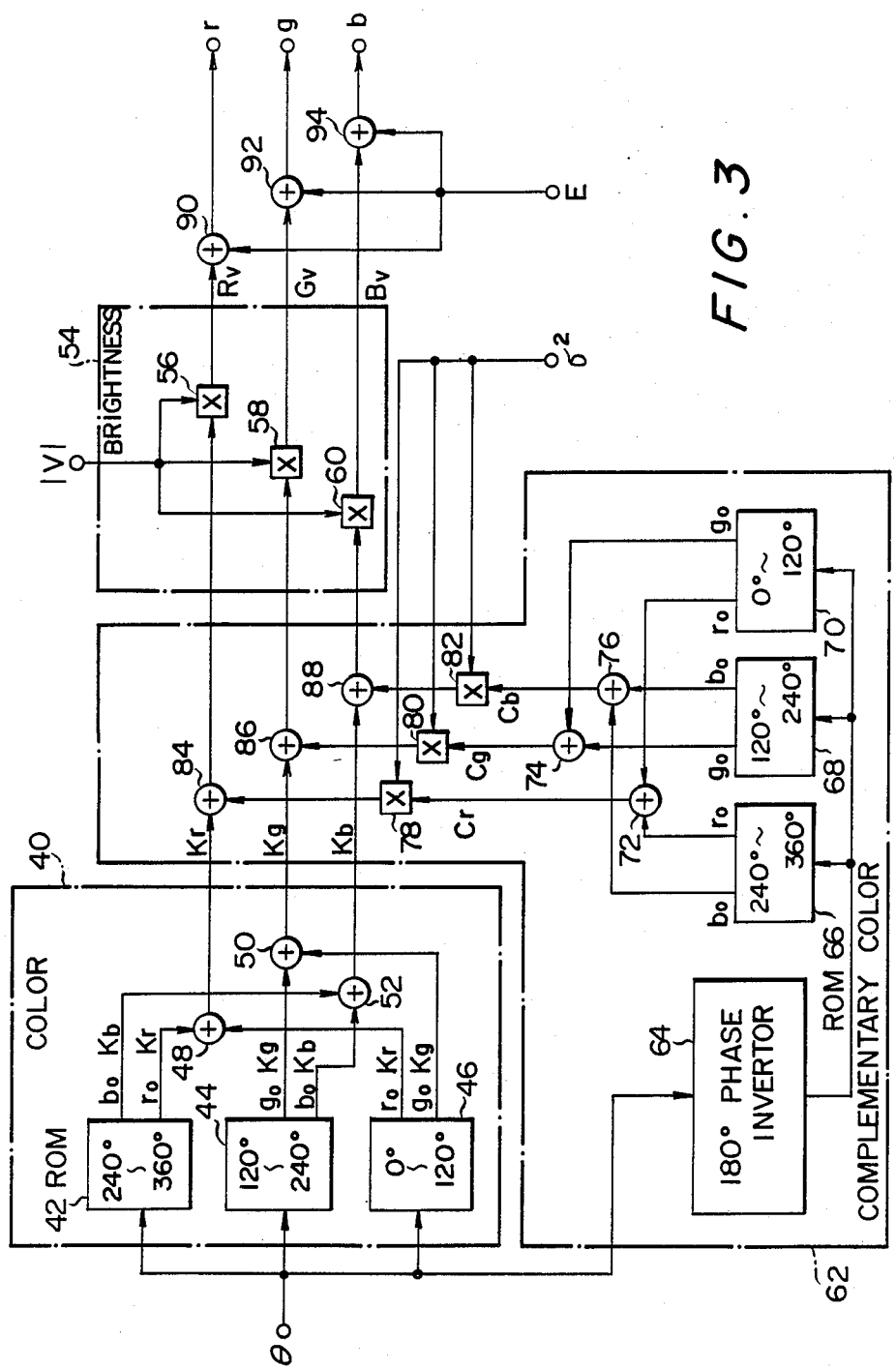
FIG. 3 is a circuit diagram showing a color processing section in the embodiment of FIG. 1.

FIG. 3 shows a concrete circuit which can be used as the color processing section 26. The arrangements and processes of the hue, brightness and complementary color mixing processors 40, 54 and 62 will sequentially be described below.

In the illustrated embodiment, the color processor 40 is adapted to divide a vector angle into three angle sections each of which in turn is combined with two different colors in the three primary colors. An image will be displayed with a hue corresponding to the ratio of mixture of the two combined colors. To this end, the color processor 40 comprises three ROM's 42, 44 and 46 and three adders 48, 50 and 52 each pair of which ROM's and adders is responsive to one of the vector angle sections spaced apart from one another by each angle of 120 degrees. The ROM 46 stores a hue corresponding to the vector angle sections ranged between 0° and 120°; the ROM 44 another hue corresponding to the vector angles between 120° and 240°; and the ROM 42 a further hue corresponding to the vector angle sections between 240° and 360°. The illustrated embodiment is adapted to represent the angle range between 0° and 120° by a hue having the rate of mixture of the red and green colors, the angle range between 120° and 240° by a hue having the rate of mixture of the green and red colors and the angle range between 240° and 360° by a hue having the rate of mixture of the blue and red colors.

Figure 4:
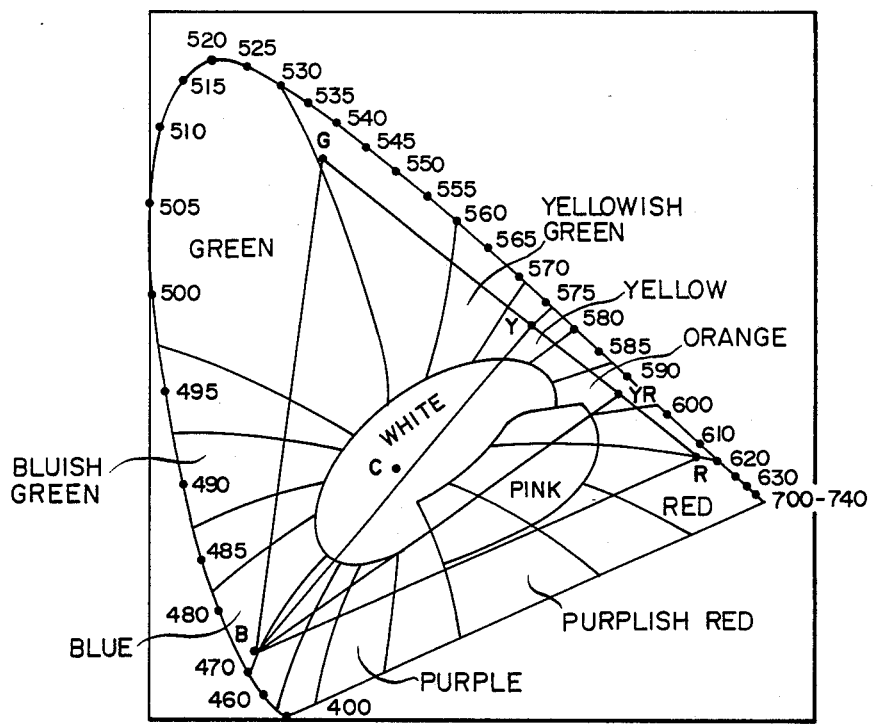
FIG. 4 is a chromaticity diagram illustrating changes in the hue set by a color processor.

FIG. 4 shows the chromaticity diagram which is well-known in the optics. In this chromaticity diagram, colors on a curve connecting R (red) with G (green) are set with the vector angles between 0° and 120°; colors on a curve connecting G (green) with B (blue) are set with the vector angles between 120° and 240°; and colors on a curve connecting B (blue) with R (red) are set with the vector angles between 240° and 360°. For example, Y (yellow) can be obtained by combining R and G with a ratio of about 1:1. This will indicate a vector angle equal to about 60° relative to the reference R.

In such a manner, hue signals Kr and Kg determining a hue between R and G and corresponding to that vector angles are read out of the ROM 46. These hue signals are respectively supplied to the adders 48 and 50 through terminals $r_0$ and $g_0$. For example, the hue of Y is provided by the ratio between $K_r$ and $K_g$ which is equal to about one (1). This is similarly applied in the other ROM's 42 and 44; the ROM 44 provides hue signals $K_g$ and $K_b$ in a hue on the curve between G and B corresponding to one of the vector angle sections between 120° and 240° to the adders 50 and 52 which are respectively connected with the terminals $g_0$ and $b_0$; and the ROM 42 provides hue signals $K_b$ and $K_r$ in a hue on the curve between B and R corresponding to one of the vector angle sections between 0° and 120° to the adders 52 and 48 which are respectively connected with the terminals $b_0$ and $r_0$. Although each of the adders 48, 50 and 52 will add two hue signals from the corresponding tow of the ROM's, the hue signals $K_r$, $K_g$ and $K_b$ will not be outputted simultaneously from the ROM's. Therefore, the outputs of the adders 48, 50 and 52 will be $K_r$, $K_g$ and $K_b$, respectively.

The brightness processor 54 comprises three multipliers 56, 58 and 60 each of which is adapted to multiply an absolute value $|V|$ (corresponding to the amplitude of a vector signal) by the corresponding one of said hue signals. Thus, the brightness processor 54 will generate at its outputs color signals $R_v$, $G_v$ and $B_v$ which have been regulated with respect to their brightness as follows:

$$R_v = |V|K_r,$$

$$G_v = |V|K_g$$

and $$B_v = |V|K_b.$$

In such a manner, the vector angles can be represented by the different hues while the amplitudes of the vector signals are indicated by the different degrees of the brightness. For example, in the heart of a patient, the vector angles indicate the directions of the blood flow while the amplitudes represent the velocities of the blood flow. Thus, the blood flow can be displayed with different colors in all the directions so that the heart can visually be observed as a very clear colored image.

The complementary color mixing processor 62 permits a deviation relative to the distribution of blood flow velocity as the third data in the living body to display in the two-dimensional manner at the same time as the vector velocity of the blood flow. Such a deviation tends to create when the velocity of the blood flow finely varies relative to the average velocity thereof and has an increased value in the flow turbulence. The velocity deviation can be color-displayed as changes of the color saturation by adding a complementary color to a hue set in accordance with the corresponding vector angle.

The complementary color mixing processor 62 comprises a 180° phase inverter 64, three ROM's 66, 68 and 70 similar to those of the color processor 40, adders 72, 74 and 76, multipliers 78, 80 and 82 and additional adders 84, 86 and 88. The 180° phase invertor 64 may be omitted if the respective ROM's 66, 68 and 70 previously store complementary colors corresponding to the respective hues set by the color processor 40 in accordance with the corresponding vector angles.

When a vector angle signal is supplied to the 180° phase invertor 64 in the complementary color mixing processor 62, the phase of the vector angle signal is inverted by 180° with the inverted angle signal being then supplied to each of the ROM's 66, 68 and 70. The output of the 180° phase invertor 64 corresponds to the respective one of complementary color signals $C_r$, $C_g$ and $C_b$ in each ROM which are set by the color processor 40. These complementary color signals $C_r$, $C_g$ and $C_b$ are applied to the inputs of the multipliers 78, 80 and 82 through the adders 72, 74 and 76, respectively.

On the other hand, each of the multipliers 78, 80 and 82 receives a variance $\sigma^2$ which is in the form of a velocity deviation signal, that is, the third living body data outputted from the ultrasonic transmission and receiver device 10. In each multiplier, this deviation signal is multiplied by the corresponding complementary color signal.

For example, when the vector angle is 60°, the hue obtained by the color processor 40 becomes yellow color. However, the complementary color mixing processor 62 inverts this vector angle signal through 60° + 180° = 240° and thereafter reads out a complementary color corresponding to the inverted signal. As a result, there will be provided a complementary color signal corresponding to blue color which is complementary to the yellow color.

After multiplied by the deviation signal, the complementary color signal is applied to the respective ones of the adders 84, 86 and 88. Each of the adders 84, 86 and 88 also receives the respective one of the hue signals $K_r$, $K_g$ and $K_b$ from the color processor 40. After each of the hue signals is added to the corresponding complementary color, it is supplied to the brightness processor 54.

Thus, the output signals of the brightness processor 54 will be:

$$R_v = |V|(K_r + \sigma^2 C_r);$$

$$G_v = |V|(K_g + \sigma^2 C_g);$$

and $$B_v = |V|(K_b + \sigma^2 C_b).$$

Although the display only by said vector angles is realized with the hues determined by the hue signals $K_r$, $K_g$ and $K_b$, the complementary color mixing processor 62 mixes the complementary color signals with the deviation signals so that the color of the displayed image will shift to white color as the variance increases. Therefore, the color saturation will be reduced. Moreover, the brightness is regulated in proportion to the absolute value of the vector velocity. Therefore, the brightness will be increased as the velocity of the blood flow increases.

In such a manner, the direction of blood flow is displayed by the hue; the variance of the blood flow velocity by the color saturation; and the magnitude of the blood flow velocity by the brightness. Particularly, the color saturation indicative of the variance of the velocity can display the state of the blood flow, such as flow turbulence.

Tomographic image signals for the living body tissue are respectively added to the respective one of signals $R_v$, $G_v$ and $B_v$ with the respective sums being supplied to the respective one of the terminals r, g and b. In such a case, the display 34 is set such that when the outputs of the terminals r, g and b are equal to each other, a white-color image will be displayed on the CRT screen.

Since the tomographic image signal E is very small at the position of the living body in which the flow of blood exists, the signals $R_v$, $G_v$ and $B_v$ appear at the terminals r, g and b without substantially variation. During scanning the position of the living body in which the flow of blood does not exist, only the tomographic image signal E appears at the terminals r, g and b.

When the data of the blood flow are displayed in the overlapped relationship with the image of the stationary parts therearound as in the illustrated embodiment, the relative relationship between the flow of blood and the stationary parts can very easily be grasped. This is very useful particularly when it is wanted to use the ultrasonic diagnostic apparatus or the like so as to observe the tomographic image of an internal organ in a living body with the motion of the blood flow.

In the illustrated embodiment, the complementary color mixing processor 62 provides the velocity deviation indicative of the spectral spread of the blood flow. However, the processor 62 may provide the other third data indicative of the sharpness of the other spectrums rather than the deviation.

One of the prior art tissue diagnosis methods is known in which waves reflected by the tissue are checked with respect to their spectral characteristics to know the properties of that tissue. Such spectrums can be displayed as vectors in accordance with the present invention since they have amplitudes and phases.

The other factors such as moment of inertia corresponding to average frequency or deviation obtained by processing the spectrums may be displayed as the third data since they can be used to know the properties of the living body.

In the illustrated embodiment, the grid voltage of the color Braun tube is controlled by the outputs of the color processing section 26. However, the RGB output voltages may be controlled by the demodulated voltages after the phase of subcarriers has been modulated as in the conventional color TV's. Furthermore, if the read-out of the frame memories 14, 16, 18 and 19 is carried out in synchronism with the scan signals of a TV, color TV and VTR can be used in the present invention.

The present invention may be applied to color-display the other signals in the living body rather than the signals of the moving reflective member such as the flow of blood. For example, the apparatus according to the present invention may be applied to the ultrasonic tissue diagnosis wherein echoes from the tissue are analyzed to know the properties of that tissue. The results can be represented by complex signals having their amplitudes and phases, that is, vectors. Moreover, the other data corresponding to the third living body data may be displayed with color saturation such that many data indicative of the properties of the tissue will be overlapped on the tomographic image.

As will be apparent from the foregoing, the present invention provides the ultrasonic blood flow imaging apparatus which can color-display the vectors with the hue and brightness such that the data including the direction of the moving reflective member will visually be indicated as very clear colored images. The present invention also provides the visual diagnosis apparatus which can provide useful data indicative of the variance of the velocity and others as images since the deviation is represented by the color saturation.

I claim:

1. An ultrasonic blood flow imaging apparatus for displaying data in a living body in a two-dimensional manner based on vector signals which are obtained from ultrasonic received signals, said ultrasonic blood flow imaging apparatus comprising:

a color processing section for forming color image signals, said color processing section comprising a color processor means responsive to vector angles in the vector signals for changing the hue said color processing means further comprising a means for dividing vector angles into three angle sections and a means for setting the respective ones of said divided angle sections at a hue having a ratio of mixture by mixing any of the three primary colors with each other; and a brightness processor means responsive to amplitudes of said vector signals for changing the brightness of the hue.

2. An ultrasonic blood flow imaging apparatus as defined in claim 1 wherein said three primary colors include red, green and blue colors.

3. An ultrasonic blood flow imaging apparatus as defined in claim 1 wherein said color processing section further comprises a means for generating at its output tissue image signals for displaying the form of the tissue as a white-color image at the same time as color image signals are outputted from said color processing section.

4. An ultrasonic blood flow imaging apparatus for displaying data in a living body in a two-dimensional manner based on vector signals which are obtained from ultrasonic received signals, said ultrasonic blood flow imaging apparatus comprising a color processing section for forming color image signals, said color processing section comprising a color processor means responsive to vector angles in the vector signals for changing the hue; and a brightness processor means responsive to amplitudes of said vector signals for changing the brightness of the hue, and a complementary color mixing processor means responsive to third data of the living body obtained from the ultrasonic received signals for mixing the hue which is outputted from said color processor with its complementary color.

5. An ultrasonic blood flow imaging apparatus as defined in claim 4 wherein said complementary color mixing processor comprises another color processor and an 180° phase invertor coupled to the output of said another color processor.

6. An ultrasonic blood flow imaging apparatus as defined in claim 4 wherein said third data in the living body is velocity deviation data in Doppler signals.

7. An ultrasonic blood flow imaging apparatus as defined in claim 4 wherein said third data in the living body is spectral data, said spectral data being obtained from a means for spectrally analyzing reflective waves reflected by the living body.

* * * * *